United States Patent
Yamada et al.

(10) Patent No.: US 7,904,778 B2
(45) Date of Patent: *Mar. 8, 2011

(54) BASE STATION DEVICE, MOBILE STATION DEVICE, CONTROL INFORMATION TRANSMISSION METHOD, CONTROL INFORMATION RECEPTION METHOD AND PROGRAM

(75) Inventors: Shohei Yamada, Osaka (JP); Daiichiro Nakashima, Osaka (JP); Keiichi Hibi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/522,517

(22) PCT Filed: Jan. 9, 2008

(86) PCT No.: PCT/JP2008/050130
§ 371 (c)(1),
(2), (4) Date: Jul. 8, 2009

(87) PCT Pub. No.: WO2008/084807
PCT Pub. Date: Jul. 17, 2008

(65) Prior Publication Data
US 2010/0042887 A1   Feb. 18, 2010

(30) Foreign Application Priority Data
Jan. 9, 2007   (JP) .................... 2007-001801

(51) Int. Cl.
*H04L 1/18*   (2006.01)
(52) U.S. Cl. ......... 714/749; 714/758; 455/515; 455/450; 370/328

(58) Field of Classification Search .................. 714/746, 714/748, 749, 750, 751, 758, 808; 455/450; 370/328, 329, 330, 338
See application file for complete search history.

(56) References Cited

U.S. PATENT DOCUMENTS

| | | | |
|---|---|---|---|
| 5,770,927 A | 6/1998 | Abe | |
| 6,639,935 B2 | 10/2003 | Gibbons et al. | |
| 6,934,527 B1 | 8/2005 | Hamada | |
| 7,640,486 B2 * | 12/2009 | Dottling et al. | ............... 714/790 |
| 2002/0071407 A1 * | 6/2002 | Koo et al. | ................... 370/335 |
| 2003/0074476 A1 | 4/2003 | Kim et al. | |
| 2005/0138531 A1 | 6/2005 | Kim | |

(Continued)

FOREIGN PATENT DOCUMENTS
EP   1 655 909 A1   10/2006

(Continued)

OTHER PUBLICATIONS

3GPP TSG-RAN WG2#54, R2-062414, "Short UE Identity for Control Signalling of Downlink Resource Scheduling", Tallinn, Estonia, Aug. 28-Sep. 1, 2006, pp. 1-5.

(Continued)

*Primary Examiner* — Guy J Lamarre
(74) *Attorney, Agent, or Firm* — Birch, Stewart, Kolasch & Birch, LLP

(57) ABSTRACT

In a radio system which allocates resources using as units resource blocks which are formed by frequency components and time components, control information for mobile station devices, and identification information which is used to identify a format for a control information transmission channel which transmits the control information is transmitted from the base station device to the mobile station devices by means of the control information transmission channel.

8 Claims, 17 Drawing Sheets

U.S. PATENT DOCUMENTS

| | | |
|---|---|---|
| 2005/0250506 A1 | 11/2005 | Beale et al. |
| 2006/0045041 A1 | 3/2006 | Yuuki |
| 2006/0148507 A1 | 7/2006 | Liljestrom et al. |
| 2006/0291403 A1 | 12/2006 | Kahtava et al. |
| 2007/0049308 A1 | 3/2007 | Lindoff et al. |
| 2007/0049311 A1 | 3/2007 | Lindoff et al. |
| 2007/0242636 A1 | 10/2007 | Kashima et al. |
| 2010/0061345 A1 | 3/2010 | Wengerter et al. |

FOREIGN PATENT DOCUMENTS

| | | |
|---|---|---|
| EP | 1 887 715 A1 | 2/2008 |
| JP | 2001-237803 A | 8/2001 |
| JP | 2003-510971 A | 3/2003 |
| JP | 2004-297756 A | 10/2004 |
| JP | 2004-343356 A | 12/2004 |
| WO | WO-01/24465 A1 | 4/2001 |
| WO | WO-2006/118304 A1 | 11/2006 |

OTHER PUBLICATIONS

Eurasian Search Report (2 pages) from related Eurasian patent Application No. 200970601 and No. 200901118 issued on Dec. 17, 2009.

\* cited by examiner

FIG. 4

|  | FIELD | | DATA SIZE |
|---|---|---|---|
| Cat. 1 (RESOURCE SPECIFICATION) | MOBILE STATION IDENTIFICATION INFORMATION (C-RNTI) | | 16bits |
| | RESOURCE ALLOCATION INFORMATION | | 25bits (DOWNLINK) 8bits (UPLINK) |
| Cat. 2 (TRANSPORT FORMAT) | MIMO-RELATED INFORMATION | | 2bits |
| | MODULATION SCHEME | | 2bits |
| | PAYLOAD SIZE | | 6bits |
| Cat. 3 (HARQ) | IN NON-SYNCHRONOUS HARQ | PROCESS NUMBER | 3bits |
| | | RETRANSMISSION NUMBER | 2bits |
| | IN SYNCHRONOUS HARQ | RETRANSMISSION NUMBER | 2bits |

| Cat. 1. 2. 3 FOR MOBILE STATION 1 | CRC |
|---|---|
| Cat. 1. 2. 3 FOR MOBILE STATION 2 | CRC |
| Cat. 1. 2. 3 FOR MOBILE STATION 3 | CRC |
| Cat. 1. 2. 3 FOR MOBILE STATION 4 | CRC |

FIG. 11

ID 1 WITHIN A FORMAT

| PRB#1,2 | PRB#3,4 | PRB#5,6 | PRB#7,8 | PRB#9,10 |

| ShortUEID#1 | ShortUEID#2 | ShortUEID#3 | ShortUEID#4 | ShortUEID#5 |

ID 2 WITHIN A FORMAT

| PRB#11,12 | PRB#13,14 | PRB#15,16 | PRB#17,18 | PRB#19,20 |

| ShortUEID#1 | ShortUEID#2 | ShortUEID#3 | ShortUEID#4 | ShortUEID#5 |

US 7,904,778 B2

BASE STATION DEVICE, MOBILE STATION DEVICE, CONTROL INFORMATION TRANSMISSION METHOD, CONTROL INFORMATION RECEPTION METHOD AND PROGRAM

TECHNICAL FIELD

The present invention relates to a base station device, a mobile station device, a control information transmission method, a control information reception method, and a program.

Priority is claimed on Japanese Patent Application No. 2007-001801, filed Jan. 9, 2007, the contents of which are incorporated herein by reference.

BACKGROUND ART

As one method for performing 3rd generation cellular mobile communication, a communication standard for the W-CDMA (Wideband Code Division Multiple Access) scheme has been standardized by 3GPP (3rd Generation Partnership Project) which is an international standardization project. Mobile telephone services based on this standard are starting up one after another in various countries. In 3GPP, examinations have been undertaken into communication technologies known as EUTRA (Evolved Universal Terrestrial Radio Access) and EUTRAN (Evolved Universal Terrestrial Radio Access Network) as new standards for this type of 3rd generation radio system. In addition, the HSDPA (High Speed Downlink Packet Access) system, which makes it possible for high speed packet communication in a W-CDMA system downlink to be performed, has also been standardized.

A simple summary will now be given of the HSDPA system and of EUTRA.

In the HSDPA system, downlink physical channels include HS-PDSCH (High Speed Physical Downlink Shared Channel) and HS-DSCH-related Shared Control Channel HS-SCCH.

The high speed physical downlink shared channel HS-PDSCH is a shared channel which is shared on the downlink by a plurality of mobile stations, and is used to transmit packet data addressed to the respective mobile stations. The HS-DSCH (High Speed Downlink Shared Channel) system is included in this HS-PDSCH as a transport channel.

The HS-DSCH-related Shared Control Channel HS-SCCH is a shared channel which is shared on the downlink by a plurality of mobile stations, and is used to transmit information about the modulation scheme and spreading code which is required information in order for each mobile station to demodulate the High Speed Physical Downlink Shared Channel HS-PDSCH, information required for error correction decoding, and information required for a HARQ (Hybrid Automatic Repeat reQuest).

Uplink physical channels in an HSDPA system include the HS-DPCCH (Dedicated Physical Control Channel for HS-DSCH).

The High Speed Dedicated Physical Control Channel HS-DPCCH for HS-DSCH is a control channel which the respective mobile stations use individually on the uplink, and is used to transmit downlink channel transmission path quality information (Channel Quality Indicators; CQI) and ACK/NACK (Acknowledgement/Negative Acknowledgement) signals which form reception confirmation information corresponding to HARQ signals.

Next, in EUTRA, an OFDM (Orthogonal Frequency Division Multiplexing) system is used for the downlink, and Adaptive Modulation and Coding Scheme (AMCS) technology which is based on adaptive radio link control such as channel coding and the like is used in this OFDM system. AMCS is a communication system which, in accordance with the transmission path situations of the respective mobile stations, switches between a variety of radio transmission parameters such as the error correction system, the error correction code rate, the number of data modulation multi-values, the code spreading rate of the time and frequency axes, and the multi-code multiplex number and the like in order to perform high speed packet data transmission efficiently. For example, in data modulation, by switching to more efficient multi-valued modulation such as switching from QPSK (Quadri-Phase Shift keying) to 8 PSK (8 Phase Shift Keying) or 16 QAM (16 Quadrature Amplitude Modulation) as the situation of the transmission path improves, it is possible to increase the maximum throughput of a communication system.

Moreover, two channel arrangement systems in an OFDM system have been proposed, namely, a Spread-OFDM system and a Non Spread-OFDM system. In a Spread-OFDM system, a physical control channel and a physical data channel are multiplexed on the same frequency band by means of spreading code multiplexing. In a Non Spread-OFDM system, a physical control channel and a physical data channel are multiplexed in time and frequency by employing TDM (Time Division Multiplexing), FDM (Frequency Division Multiplexing), or a combination of TDM and FDM.

In EUTRA, radio frames for downlinks based on an OFDM system are divided in a frequency direction and a time direction, and the data for each mobile station is mapped onto each of these divided blocks. By using mobile station identification information which identifies the respective mobile stations in order to perform this mapping, allocation information showing the allocation of mobile stations to each block is transmitted from the base station.

Patent Document 1: Japanese Unexamined Patent Application, First Publication No. 2001-237803
Patent Document 2: Japanese Unexamined Patent Application, First Publication No. 2004-297756

DISCLOSURE OF INVENTION

Problem to be Solved by the Invention

Here, in EUTRA, what type of control information should be used in order to exchange the aforementioned allocation information used for mapping between the base station and the mobile stations is a significant problem, and an efficient method for transmitting and receiving control information is needed.

The present invention was conceived in view of the above described circumstances, and it is an object thereof to provide a base station device, a mobile station device, a control information transmission method, a control information reception method, and a program which make it possible to efficiently transmit and receive control information in a radio system.

Means for Solving the Problem

According to one aspect of the present invention, there is provided a base station device in a mobile communication system, comprising the base station device transmits to mobile station devices, by means of a control information transmission channel, control information for the mobile station devices, and identification information which is used to identify a format for the control information transmission channel which transmits the control information.

Moreover, in the above described base station device, the identification information includes group identification information which identifies a mobile station group which has one or a plurality of the mobile station devices as its component elements.

Moreover, in the above described base station device, the identification information is set in accordance with a format which is predetermined in accordance with the position within radio resources where the control information transmission channel is placed.

According to another aspect of the present invention, there is provided a mobile station device in a mobile communication system, comprising the mobile station device receives a signal from the base station device in which control information for mobile station devices, and identification information which is used to identify a format for a control information transmission channel which transmits the control information are included in the control information transmission channel, and the mobile station device acquires control information in the signal in accordance with the identification information in the received signal.

Moreover, in the above described mobile station device, the identification information includes group identification information which identifies a mobile station group which has one or a plurality of the mobile station devices as its component elements.

Moreover, in the above described mobile station device, the identification information is set in accordance with a format which is predetermined in accordance with the position within radio resources where the control information transmission channel is placed.

According to still another aspect of the present invention, there is provided a method for transmitting control information from a base station device to mobile station devices in a mobile communication system, comprising transmitting control information for the mobile station devices and identification information which is used to identify a format for a control information transmission channel which transmits the control information from the base station device to the mobile station devices by means of the control information transmission channel.

According to still another aspect of the present invention, there is provided a method for receiving control information in a mobile communication system in which mobile station devices receive control information from a base station device, comprising receiving a signal from the base station device in which control information for mobile station devices, and identification information which is used to identify a format for a control information transmission channel which transmits the control information are included in the control information transmission channel, and acquiring the control information in the signal in accordance with the identification information in the received signal.

According to still another aspect of the present invention, there is provided a program for use in mobile station devices in a mobile communication system to which resources have been allocated by a base station device, the program causing the mobile station to execute: receiving a signal from the base station device in which control information for mobile station devices, and identification information which is used to identify a format for a control information transmission channel which transmits the control information are included in the control information transmission channel; and acquiring the control information in the signal in accordance with the identification information in the received signal.

Effect of the Invention

According to the present invention, it is possible to efficiently transmit and receive control information in a radio system.

BRIEF DESCRIPTION OF THE DRAWINGS

FIG. 4 is a view showing control information which is transmitted by means of downlink shared control channel PSCCH.

FIG. 11 is a view showing an example in which the group formation method for groups within a format shown in FIG. 10($a$) is applied to the signal format of the downlink shared control channel PSCCH shown in FIG. 8($a$).

REFERENCE SYMBOLS

Figure 1:
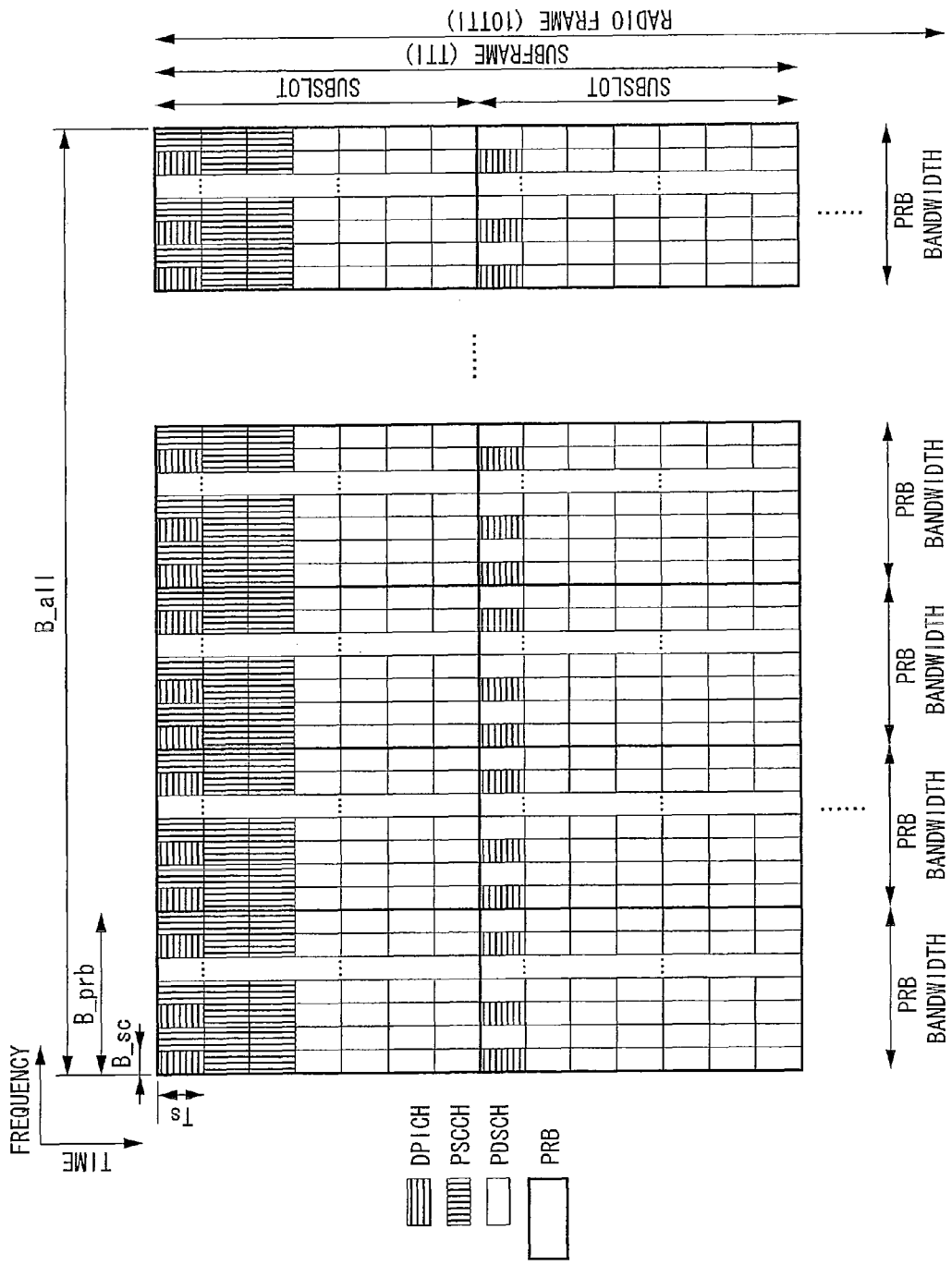
FIG. 1 is a view showing the structure of downlink radio frames used in a radio system according to an embodiment of the present invention.

10 Base station device
101 Data control section
102 Data modulation section
103 OFDM modulation section
104 Radio section 105 Channel estimation section
106 DFT-S-OFDM demodulation section
107 Data demodulation section
108 Control data extraction section
109 Scheduling section
109-1 DL scheduling section
109-2 UL scheduling section
110 Radio resource control section
20 Mobile station device
21 Transmitting section
22 Receiving section
201 Radio section
202 Scheduling section
203 Radio resource control section
204 Radio control section
211 Data control section
212 Data modulation section
213 DFT-S-OFDM modulation section
221 Channel estimation section
222 OFDM demodulation section
223 Data demodulation section
224 Control data extraction section

BEST MODE FOR CARRYING OUT THE INVENTION

Hereinafter, an embodiment of the present invention will be described in detail with reference made to the drawings.

1. Radio Frame Structure

FIG. 1 shows the structure of downlink radio frames which are used in a radio system according to the present embodiment. In FIG. 1, a downlink radio frame is formed from blocks which are known as PRB (Physical Resource Blocks) and which are units of radio resources which are used in communication. A single PRB is prescribed as having a frequency width B_prb which corresponds to one or a plurality of subcarriers, and a time length (1 sub slot) which corresponds to one or a plurality of OFDM symbols.

Here, in FIG. 1, for the frequency axis, the frequency bandwidth B_all of the entire downlink is set at 20 MHz, the guard bandwidth is set at 2 MHz, the frequency bandwidth B_prb of a single PRB is set at 180 kHz, and the frequency bandwidth B_sc of a subcarrier is set at 15 kHz. For the time axis, the length of a single radio frame is set at 10 ms, and a TTI (Transmission Time Interval) which is a unit transmission time (subframe) is set at 1 ms. One subframe is formed by two subslots, and one subslot is formed by seven OFDM symbols (OFDM symbols have a length of Ts). In this radio frame structure, a total of 200 PRB, namely, 100 in the frequency axial direction and 20 in the time axial direction are contained in a single radio frame. Note, however, that in FIG. 1 the guard band has not been shown.

Data which is transmitted on a downlink includes: (a) user data utilized by a user; (b) downlink control information and uplink control information such as mobile station identification information (UEID—User Equipment IDentity), modulation scheme, error correction scheme, information required for HARQ, and data length; and (c) a known pilot signal which is used for transmission path estimation when demodulation is performed on the user data, the downlink control information, and the uplink control information. These are all mapped within each subframe. Moreover, in the leading subframe of each radio frame are also mapped: (d) synchronous signals which are used to synchronize the frames; and (e) common control information which is used to give notification about the overall frame structure. In addition to these, (f) paging information and (g) MBMS (Multimedia Broadcast Multicast Service) information are also mapped.

Downlink physical channels which are used as channels to transmit each of these data include downlink shared data channels PDSCH (Physical Downlink Shared CHannel), downlink shared control channels PSCCH (Physical Shared Control CHannel), downlink pilot channels DPICH (Downlink Pilot CHannel), synchronization channels SCH (Synchronization Channel), common control channels CCPCH (Common Control Physical CHannel), paging channels PCH (Paging CHannel), and multicast channels MCH (Multitasked Channel).

The subframes shown in FIG. 1 are subframes which transmit data to mobile station addresses, the downlink pilot channel DPICH, the downlink shared control channel PSCCH, and the downlink shared data channel PDSCH are included in these subframes. In subslot 1 within a subframe, the downlink pilot channel DPICH and the downlink shared control channel PSCCH are placed in the first OFDM symbol. The downlink shared control channel PSCCH is placed in the second and third OFDM symbols. The downlink shared data channel PDSCH is placed in the fourth and subsequent OFDM symbols. In the second subslot, the downlink pilot channel DPICH is placed in the first OFDM symbol, and the downlink shared data channel PDSCH is placed in the second and subsequent OFDM symbols.

The downlink pilot channel DPICH is the channel which transmits the data for the above described (c), and is used for power measurement when cell search or handover is being performed, for CQI measurement in order to perform adaptive modulation, and in transmission path estimation which is performed in order to demodulate the downlink shared control channel PSCCH and the downlink shared data channel PDSCH.

The downlink shared control channel PSCCH is the channel which transmits the data for the above described (b). Here, in the downlink control information of the downlink shared control channel PSCCH, the PRB modulation scheme, the data length, the position of the PRB where the data addressed to the mobile stations is placed, and the information required for the HARQ and the like are included as control information which is required to demodulate user data. In the uplink control information are included power control, PRB transmission timing control, the position of the PRB to which the mobile station is transmitting data, demodulation scheme, the data length, and the ACK/NACK of the HARQ for the data transmitted by the mobile station.

The downlink shared data channel PDSCH is the channel which transmits the data for the above described (a), namely, the user data. When this user data is being demodulated, information about the modulation scheme and data length which is transmitted by the downlink shared control channel PSCCH is used. Moreover, in order to demodulate the downlink shared control channel PSCCH, transmission path estimation is performed using a pilot signal of the downlink pilot channel DPICH. Note that the downlink shared data channel PDSCH can be shared by a plurality of mobile stations.

Figure 2:
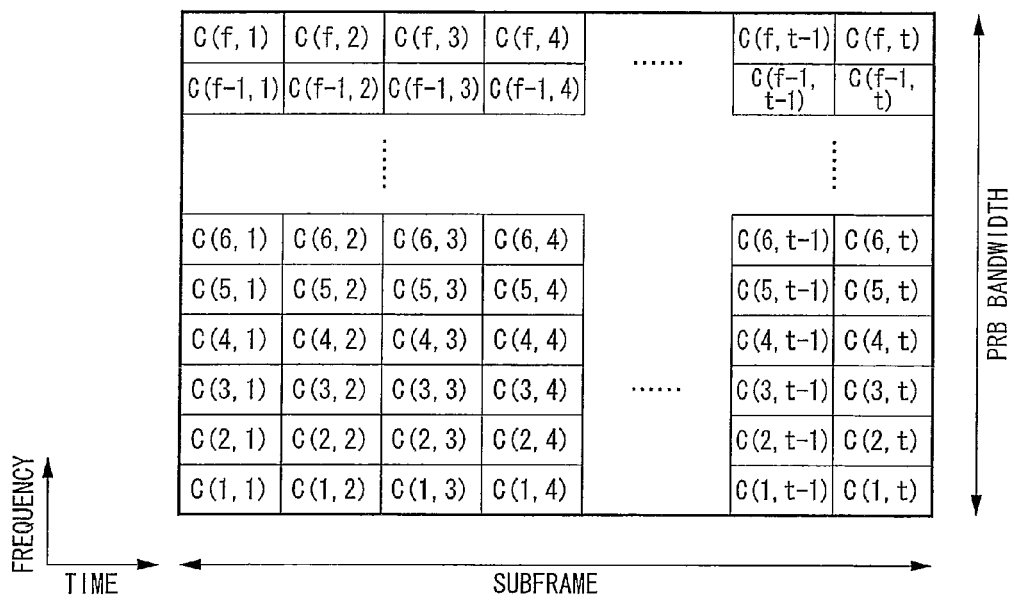
FIG. 2 is a view showing a single PRB which is expressed by an arrangement C (f, t).

FIG. 2 is a view showing a single PRB which is expressed by an arrangement C (f, t). f is the subcarrier number, and t is the OFDM symbol number. Because the frequency bandwidth B_prb of the PRB is 180 kHz, and the frequency bandwidth B_sc of the subcarrier is 15 kHz, twelve subcarriers are contained in a single PRB. Accordingly, $1 \leq f \leq 12$. In addition, a single subslot is formed by seven OFDM symbols, however, this corresponds to when the OFDM symbol length Ts is a short CP (Short Cyclic Prefix) of 0.07 ms. It is also possible to extend the guard interval length of the OFDM symbols to make a long CP. In this case, if the OFDM symbol length Ts is set, for example, to 0.08 ms, then six OFDM symbols are contained in a single subslot. Accordingly, in the case of a short CP, $1 \leq t \leq 7$, while in the case of a long CP, $1 \leq t \leq 6$.

In the same way as in the downlink, the uplink radio frames are also blocks which are made up respectively by predetermined frequency bands and time bands, and are formed from resource blocks which are radio resource units used in communication. Hereinafter, these blocks are referred to as PRU (Physical Resource Units). If, for example, the overall bandwidth of the uplink (i.e., the uplink frequency bandwidth) is taken is 20 MHz, the PRU bandwidth is taken is 180 kHz, the subcarrier frequency bandwidth Bsc is taken as 15 kHz, the length of a single radio frame is taken as 10 ms, the user unit transmission time TTI is taken as 1.0 ms (subframes), and the guard band is 2 MHz, then a single radio frame is formed by 1000 PRU, namely, by 100 PRU in the frequency axial direction and 10 PRU in the time axial direction.

2. Dynamic Format and Semi-Static Format

In the radio system of the present embodiment, each mobile station receives control information from the base station in either a dynamic format or semi-static format, or in both a dynamic format and a semi-static format. Here, in the case of a dynamic format, the control information is transmitted from the base station in a predetermined channel for each TTI (i.e., subframe). In contrast, in the case of a semi-static format, the control information is transmitted from the base station in advance, for example, at the start of communication, and is not transmitted for each TTI. In addition, information which is different from the control information sent beforehand (such as mobile station identification information and the like—described in detail below) is transmitted for each TTI. The base station designates whether each mobile station will receive control information in dynamic format or in semi-static format.

Hereinafter, descriptions will be given of the dynamic and semi-static formats.

2. (1) Dynamic Format

Figure 3:
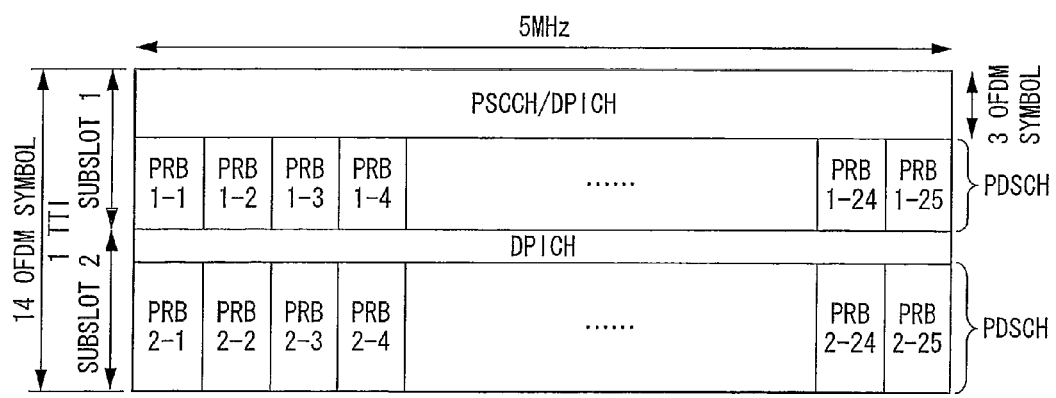
FIG. 3 is a view showing a channel arrangement in a downlink when a dynamic format is used.

FIG. 3 shows the channel arrangement in a downlink. Here, one subframe having a frequency width of 5 MHz is shown. One PRB has a frequency bandwidth B_prb of 180 kHz, and 25 PRB are contained within one subslot of 5 MHz width. One subframe is formed by two subslots (i.e., subslot 1 and subslot 2). In the leading OFDM symbol of each subslot, the downlink pilot channel DPICH is placed every three subcarriers, namely, C (x, 1): x=2, 5, 8, 11. The downlink shared control channel PSCCH is placed in an area of the leading OFDM symbol of subslot 1 which is not used for the downlink pilot channel DPICH, namely, in C (x, 1): x≠2, 5, 8, 11, and in the second and third OFDM symbols of subslot 1, namely, in C (x, 2): x=1 to 12 and C (x, 3): x=1 to 12. The downlink shared data channel PDSCH is placed in the remaining areas of subslot 1 and subslot 2.

Resource allocation for the mobile stations is performed using the downlink shared control channel PSCCH which was placed in the manner described above. Here, as is described above, the downlink shared control channel PSCCH is only placed in subslot 1, however, the PRB of subslot 1 and the PRB of subslot 2 are associated together in advance, and if the PRB of subslot 1 is designated for a mobile station by the downlink shared control channel PSCCH which has been placed in subslot 1, then because of the aforementioned association, the PRB of subslot 2 is also determined automatically. Because of this, compared with when different resource allocation is performed for each subslot using the downlink shared control channel PSCCH in each subslot, the control information load can be made lighter. In this manner, the resource allocation designation for a single subframe is performed in lots of 25 PRB.

Figure 5:
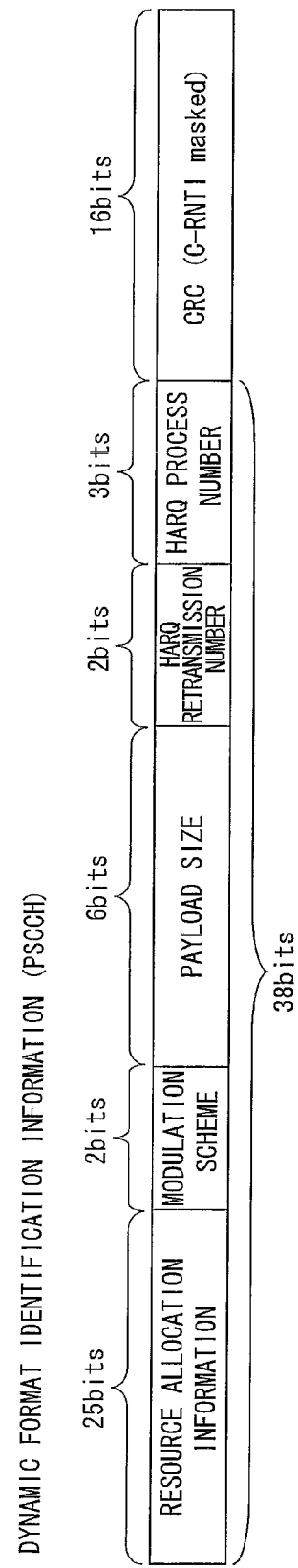
FIG. 5 is a view showing a signal format of the downlink shared control channel PSCCH.

FIG. 4 shows control information transmitted by the downlink shared control channel PSCCH (i.e., control information in a dynamic format). FIG. 5 shows the signal format of the downlink shared control channel PSCCH. As is described above, downlink control information or uplink control information is contained in the downlink shared control channel PSCCH.

The downlink control information is formed by the respective information from three categories: Cat1, Cat2, and Cat3. Cat1 is used for resource allocation and includes mobile station identification information and downlink resource allocation information. Cat2 shows the transport format of the downlink shared data channel PDSCH allocated to each mobile station, and includes the modulation scheme, payload size, and MIMO (Multiple Input Multiple Output)-related information. Cat3 is information relating to HARQ, and includes process numbers and retransmission numbers in the case of asynchronous HARQ, and retransmission numbers in the case of synchronous HARQ.

Moreover, in the same way, the uplink control information is formed by the respective information from three categories: Cat1, Cat2, and Cat3. Cat1 is used for resource transmission grant and includes mobile station identification information and resource allocation information for uplink data transmissions. Cat2 shows the transport format when the respective mobile stations are transmitting uplink data, and includes the modulation scheme, payload size, and MIMO (Multiple Input Multiple Output)-related information. Cat3 is information relating to HARQ, and includes retransmission numbers due to synchronous HARQ being used in the uplink. Furthermore, uplink time synchronization signals are also contained in the uplink control information. These uplink time synchronization signals are necessary to enable synchronous processing to be performed during an uplink transmission in order for differences between data arrival times which are caused by variations in the distances between the base station and the mobile stations to be adjusted on the mobile station side.

Here, the data sizes of the respective types of information are as follows.

The mobile station identification information is able to be identified within the base station, and uses specific 16-bit C-RNTI (Cell Specific Radio Network Temporary Identity).

Figures 6, 7:
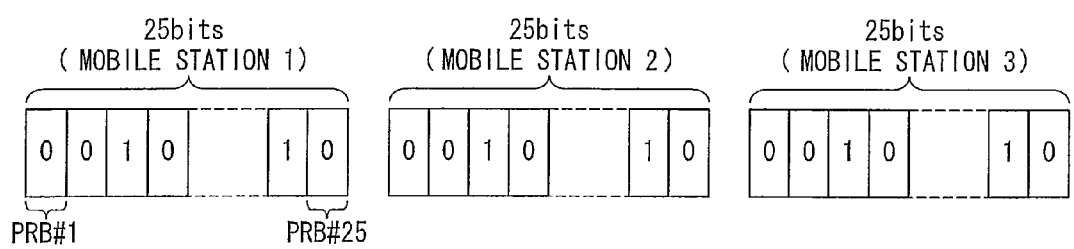
FIG. 6 is a view showing an example of resource allocation information.
FIG. 7 is a view illustrating a coding method for the downlink shared control channel PSCCH.

The resource allocation information for the downlink control information uses bitmap corresponding to the number of PRB, and shows which PRB a mobile station should use. Here, because there are 25 PRB (see FIG. 3), the resource allocation information requires 25 bits. FIG. 6 shows an example of resource allocation information. In the case of this example, PRB #3 and PRB #24 are allocated.

The resource allocation information for the uplink control information specifies blocks which are continuous using a start block number (4 bits) and an end block number (4 bits). The reason for this is that, because a single carrier transmitter is used in the uplink, it is necessary to perform allocation in a continuous block.

The modulation scheme which is used can be any one of QPSK 1/8, QPSK 1/4, QPSK 1/2, QPSK 2/3, 16 QAM 1/2, 16 QAM 2/3, 64 QAM 1/2, 64 QAM 3/5, 64 QAM 2/3, and 64 QAM 3/4, and four of these are used. Accordingly, two bits are required in order to identify these four modulation schemes.

The payload size shows the information quantity of data transmitted by the downlink shared data channel PDSCH in six bits.

The MIMO related information shows the number of antennas, the number of streams, and MIMO control information using two bits.

The HARQ process number is information which is used to identify the HARQ process, and three bits are required for this.

The HARQ retransmission number shows the retransmission sequence within a particular HARQ process, and is expressed in two bits.

The uplink time synchronization signal uses one bit in order to show the difference from the current synchronization time of a mobile station.

In this manner, in a dynamic format, control information made up of a total of 56 bits for the downlink control information or a total of 37 bits for the uplink control information is transmitted using the downlink shared control channel PSCCH. In contrast, as was illustrated using FIG. 3, because the downlink shared control channel PSCCH is placed in a portion of the leading OFDM symbol of a single subframe (per one PRB, subtracting from the 12 subcarriers the 4 subcarriers which are used by the downlink pilot channel DPICH) and in the second and third OFDM symbols, the number of subcarriers transmitting the downlink shared control channel PSCCH within the one subframe having a 5 MHz width shown in FIG. 3 is:

$$(12-4) \times 25 + 12 \times 25 \times 2 = 800$$

When these 800 subcarriers are coded, for example, using a QPSK modulation scheme and a code rate of ⅓, then 533 bits can be transmitted.

Accordingly, in one subframe having a 5 MHz width, it is calculated that it is possible for a maximum of five (533÷93) downlink shared control channels PSCCH to be contained in each of the downlink and uplink. Namely, when control information is transmitted using a dynamic format, it is possible to allocate five mobile stations to each of the downlink and the uplink for one TTI (i.e., subframe) (for a frequency bandwidth of 5 MHz). However, it is not essential for the number of uplink control information units and downlink control information units to be the same.

FIG. 7 is a view illustrating a coding method for the downlink shared control channels PSCCH. In order to code the downlink shared control channels PSCCH, UEID masked CRC (Cyclic Redundancy Check) is used as the mobile station identification information C-RNTI for each mobile station. In addition, the downlink shared control channels PSCCH are coded such that the CRC bit string which is obtained by performing CRC on the data of the relevant channel is the same as the mobile station identification information C-RNTI.

In this manner, the coding of the downlink shared control channels PSCCH is performed individually for each mobile station in accordance with the mobile station which is the destination of that transmission. The mobile stations (i.e., dynamic format mobile stations) receive all of the downlink shared control channels PSCCH of each TTI and perform CRC thereon, and once a mobile station has obtained the same CRC bit string as its own mobile station identification information C-RNTI, it identifies that this downlink shared control channel PSCCH is addressed to itself, and that decoding can be performed correctly.

2. (1) Semi-Static Format

The semi-static format is a signal format for when a portion of resource allocation information, modulation scheme, payload size, MIMO-related information, information relating to HARQ, and mobile station identification information and the like are transmitted at the start of communication or the like and are made semi-static.

Figure 8:
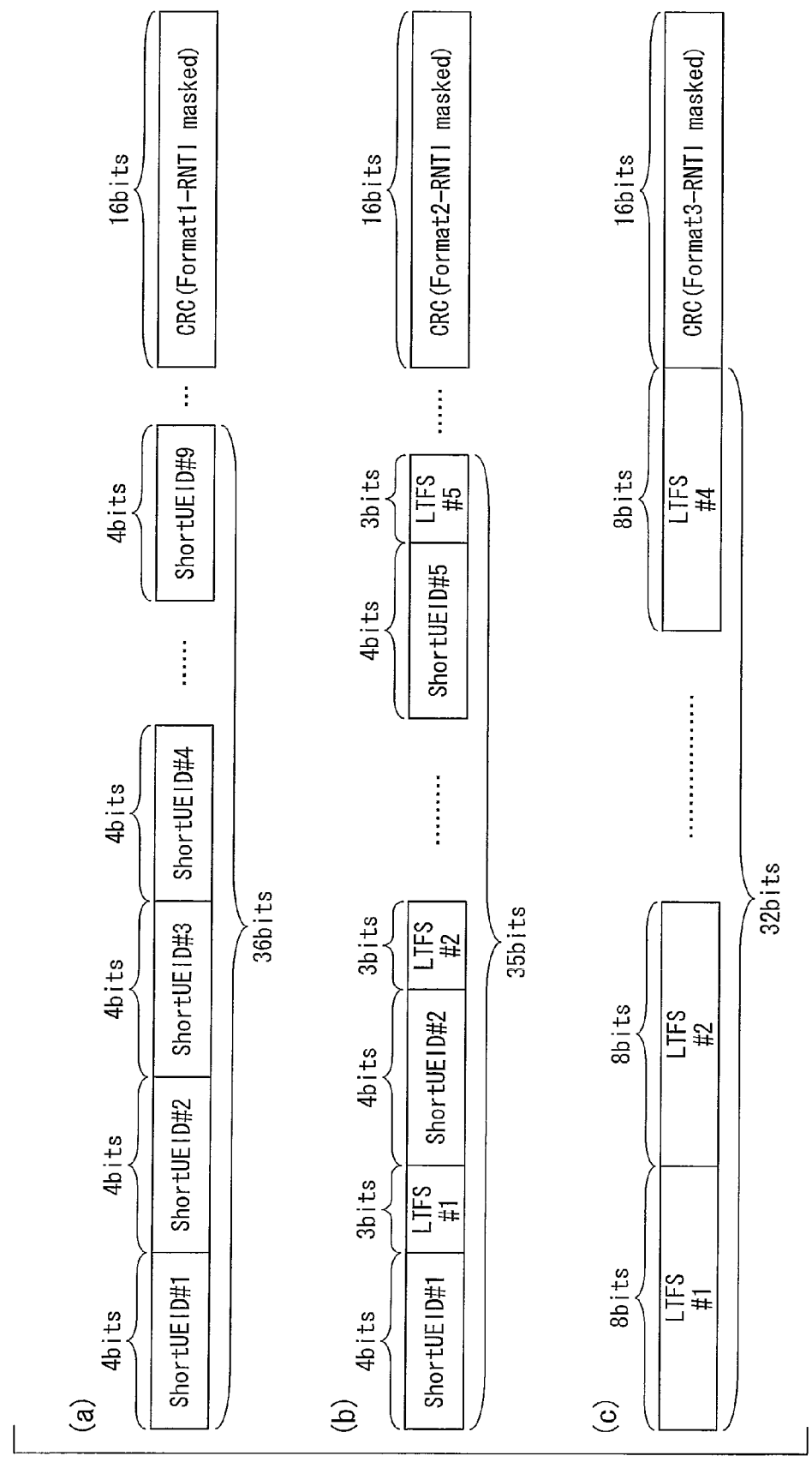
FIG. 8 is a view showing a signal format of the downlink shared control channel PSCCH which is transmitted to a semi-static format mobile station.

FIG. 8 shows the signal formats of downlink control information or uplink control information for a downlink shared control channel PSCCH which is transmitted to a semi-static format mobile station. The signal format for a downlink shared control channel PSCCH in the case of a semi-static format can have a variety of types as is shown by (a) through (c) in FIG. 8.

FIG. 8(a) is the signal format when control information other than the mobile station identification information (i.e., resource allocation information, modulation format, payload size, MIMO-related information, and information relating to HARQ) is transmitted at the start of communication and is made semi-static. Here, Short UEID is utilized as the mobile station identification information. Short UEID is identification information which is used to identify each mobile station among a group made up of a plurality of mobile stations, and is constructed, for example, in four bits which is shorter than the C-RNTI of the above described dynamic format. Accordingly, the number of mobile stations which can be identified using this Short UEID is 16. Short UEID is not limited to four bits, and it is also possible to use different bit numbers in accordance with the signal format of the PSCCH.

The format shown in FIG. 8(a) is defined as Format 1. In Format 1, only the Short UEID and the CRC are arranged in a downlink shared control channel PSCCH. Nine Short UEID fields are provided, and the position of each field is matched 1 to 1 with the PRB which is to be used by the mobile station whose own Short UEID was specified in that field. Namely, a PRB or PRU which has been matched to a particular Short UEID field is allocated to the mobile station whose Short UEID has been specified in that particular Short UEID field.

16-bit identification information showing Format 1 (F1-ID) is attached to a CRC area. The identification information identifying the format of this downlink shared control channel PSCCH is called format ID. By preparing a plurality of these F1-ID, it is possible to group together the mobile stations using Format 1. By employing this method, for each group of Format 1, the base station sets mobile stations whose Short UEID is to be specified. These format IDs may also be structured such that different ID are allocated between the uplink control information and the downlink control information of a downlink shared control channel PSCCH.

FIG. 8(b) is a signal format for when the Short UEID is used and also a portion of the control information is altered dynamically. This format is defined as Format 2. Here, the control information which is dynamically altered is called LTFS (Limited Transport Format Set). In FIG. 8(b), the LTFS is taken as being information which it is possible to express using 3 bits. In this case, five sets of Short UEID and LTFS can be arranged in a downlink shared control channel PSCCH. 16-bit identification information showing Format 2 (F2-ID) is attached to a CRC area.

FIG. 8(c) is a signal format for when Short UEID is not used and a portion of the control information is dynamically altered. This format is defined as Format 3. 16-bit identification information showing Format 3 (F3-ID) is attached to a CRC area. Because Short UEID is not used, the number of mobile stations which are able to use the respective LTFS fields is limited to one mobile station within a group. Because of this, associations are configured in advance between the LTFS field and the mobile stations within the group using exchanges between the base station and the mobile stations.

Usage of the LTFS field is able to be configured for each individual mobile station. In this example, the LTFS is formed by eight bits.

By employing this type of structure, it becomes possible to share the payload portion of a downlink shared control channel PSCCH between a plurality of formats, and it becomes possible to use a plurality of formats in the same physical channel.

Figure 9:
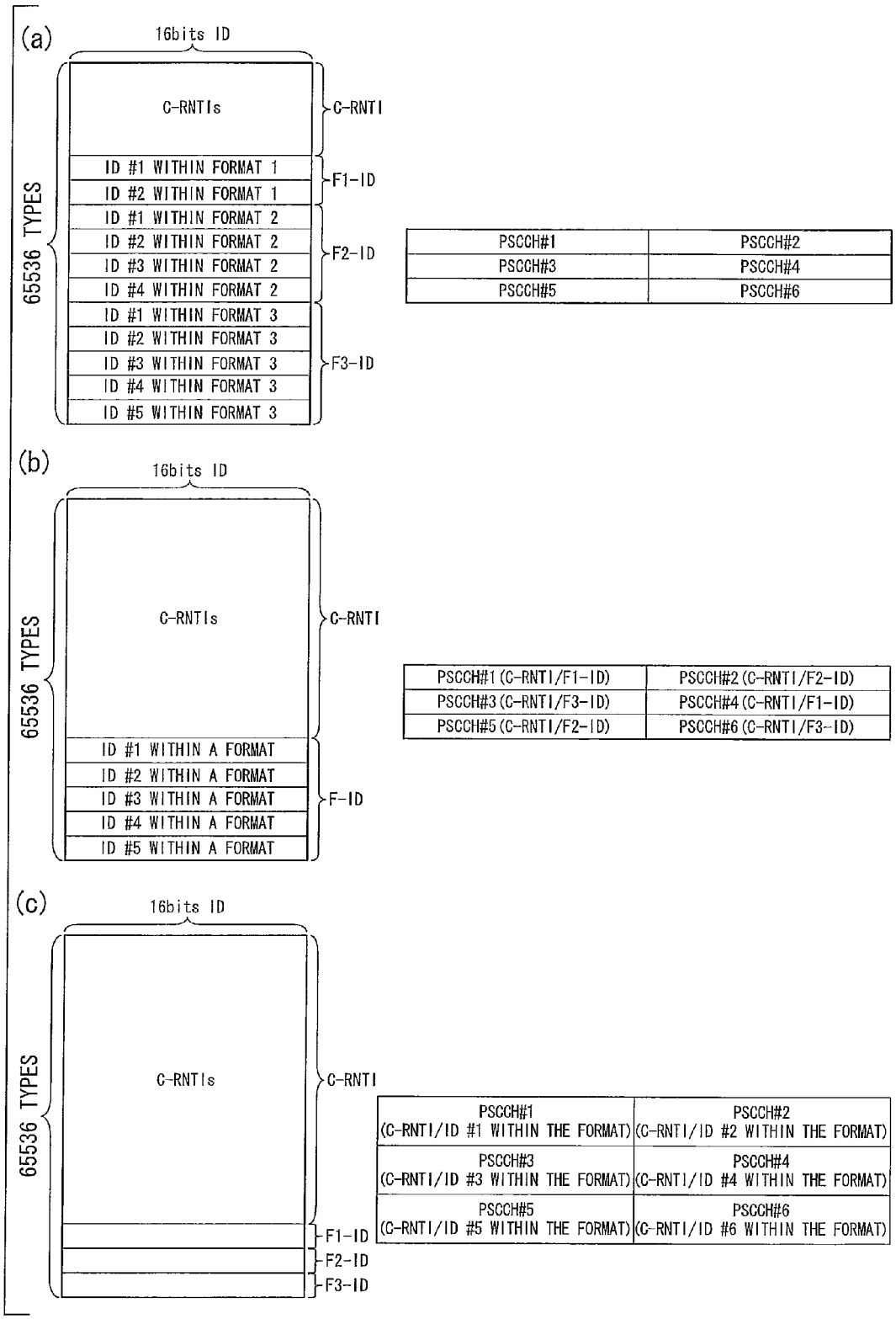
FIG. 9 is a view illustrating identification information which is imparted to a CRC area of the downlink shared control channel PSCCH.

FIG. 9 is a view illustrating identification information which is attached to a CRC area of a downlink shared control channel PSCCH.

FIG. 9(a) shows a relationship when a 16-bit ID is shared by the C-RNTI, the F1-ID, the F2-ID, and the F3-ID. In a 16-bit ID, it is possible to allocate 65,536 types of ID, and these are divided between an area where they are used as the C-RNTI, an area where they are used as the F1-ID, an area where they are used as the F2-ID, and an area where they are used as the F3-ID. An area which is not used by the other formats is allocated for the C-RNTI to the mobile stations. Two IDs, namely, ID #1 in Format 1 and ID #2 in Format 1 are allocated for IDs used as F1-ID. As is described above, this is because a plurality of IDs to be used in Format 1 are prepared, and these are used as group IDs to identify groups inside a format. The plurality of mobile stations which use Format 1 are divided into groups, and IDs in Format 1 are used for the identification of each of these groups. In the same way, a plurality of IDs in Format 2 and a plurality of IDs in Format 3 are prepared and are used as group IDs. These group IDs may also be structured such that different ID are allocated between the uplink control information and the downlink control information of a downlink shared control channel PSCCH. The classification of the 16-bit ID shown in FIG. 9(a) is notified to the mobile stations by RRC signaling or broadcast information. It is also possible to simply use several higher order bits of the 16-bit ID as the format identifier. Moreover, it is also possible to reduce the amount of information to be notified by means of RRC signaling or broadcast information by specifying the classification in FIG. 9(a) in advance.

FIG. 9(b) shows a method in which, by performing the format identification described in FIG. 9(a) using physical control signal placement, a 16-bit ID area can be efficiently utilized. Areas of the downlink shared control channels PSCCH are grouped together, and format identifiers are associated with each of the PSCCH area groups. When there are six downlink shared control channel PSCCH areas, then the formats which can be used in each downlink shared control channel area are limited. For example, PSCCH #1 and PSCCH #4 are set in advance for use by Format 1 or C-RNTI, and PSCCH #2 and PSCCH #5 are set in advance for use by Format 2 or C-RNTI. Even if the same information string is allocated as a 16-bit ID for Format 1 and Format 2, they can be identified by the physical placement of the control signals. By employing this type of method, a 16-bit ID is only used as an identifier in order to specify C-RNTI or an ID within a format, and it is possible to reduce the identifiers which are used to specify formats. These associations are notified to the mobile stations using broadcast information or RRC signaling.

FIG. 9(c) shows a method in which, by performing the identification of groups within a format described in FIG. 9(a) using physical control signal placement, a 16-bit ID area can be efficiently utilized. Areas of the downlink shared control channels PSCCH are grouped together, and identifiers of groups within a format are associated with each of the PSCCH area groups. When there are six downlink shared control channel PSCCH areas, then the groups within a format which can be used in each downlink shared control channel area are limited. For example, PSCCH #1 is set in advance for use by ID #1 within a format or C-RNTI, and PSCCH #2 is set in advance for use by ID #2 within a format or C-RNTI. Even if the same information string is allocated as a 16-bit ID for ID #1 within a format and ID #2 within a format, they can be identified by the physical placement of the control signals. By employing this type of method, a 16-bit ID is only used as an identifier in order to specify C-RNTI or a format, and it is possible to reduce the identifiers which are used to specify groups within a format. These associations are notified to the mobile stations using broadcast information or RRC signaling.

It is also possible to use a combination of FIG. 9(b) and FIG. 9(c). By grouping together areas of the downlink shared control channels PSCCH, and associating a portion of the groups within a format and a portion of the groups with the respective PSCCH groups, it is possible to efficiently utilize the 16-bit ID areas. For example, PSCCH #1 and PSCCH #4 are set in advance for use by ID #1 to #2 within Format 1, or by ID #1 to #2 within Format 2, or by C-RNTI, and PSCCH #2 and PSCCH #5 are set in advance for use by ID #3 to #4 within Format 1, or by ID #1 to #2 within Format 3, or by C-RNTI. Even if the same information string is allocated as a 16-bit ID for ID #1 within Format 2 and ID #1 within Format 3, they can be identified by the physical placement of the control signals. These associations are notified to the mobile stations using broadcast information or RRC signaling.

The method used to group together the groups within the formats may be a method in which groups within a format having different associated physical resources are grouped together, or a method in which groups within a format having different users are grouped together. FIG. 10(a) shows groupings of PRB, with PRB group 1 containing PRB #1 through PRB #4, PRB group 2 containing PRB #5 through PRB #8, and PRB group 3 containing PRB #9 through PRB #12. The PRB groups may be set so as to extend across a plurality of radio frames, or may be set in TTI units. FIG. 10(b) shows groupings of mobile stations, with UE group 1 containing UE #1 through UE #4, UE group 2 containing UE #5 through UE #8, and UE group 3 containing UE #9 through UE #12. FIG. 10(c) shows groupings made up of sets of UE groups and PRB groups, with group set 1 containing PRB #1 through PRB #4 and UE #1 through UE #4, group set 2 containing PRB #5 through PRB #8 and UE #5 through UE #8, and group set 3 containing PRB #9 through PRB #12 and UE #9 through UE #12. Here, a description has been given of when downlink PRB are grouped together, however the uplink PRU are also grouped together into PRU groups.

FIGS. 11 through 14 show an example in which the grouping method for groups within formats shown in FIG. 10(a) through 10(c) is performed on the signal format of the downlink shared control signals PSCCH shown in FIG. 8(a) through 8(c).

FIG. 11 shows a case in which FIG. 8(a) and FIG. 10(a) are combined. In the case of Format 1, because there is no information for resource allocation, it is necessary to associate in advance the placement of the Short UEID with the position of the PRB or PRU. This association is identified by the ID within the format. In this example, in the case of ID #1 within the format, the area of Short UEID #1 is associated with PRB #1 and PRB #2. In the case of ID #2 within the format, the area of Short UEID #1 is associated with PRB #11 and PRB #12.

Figure 12:
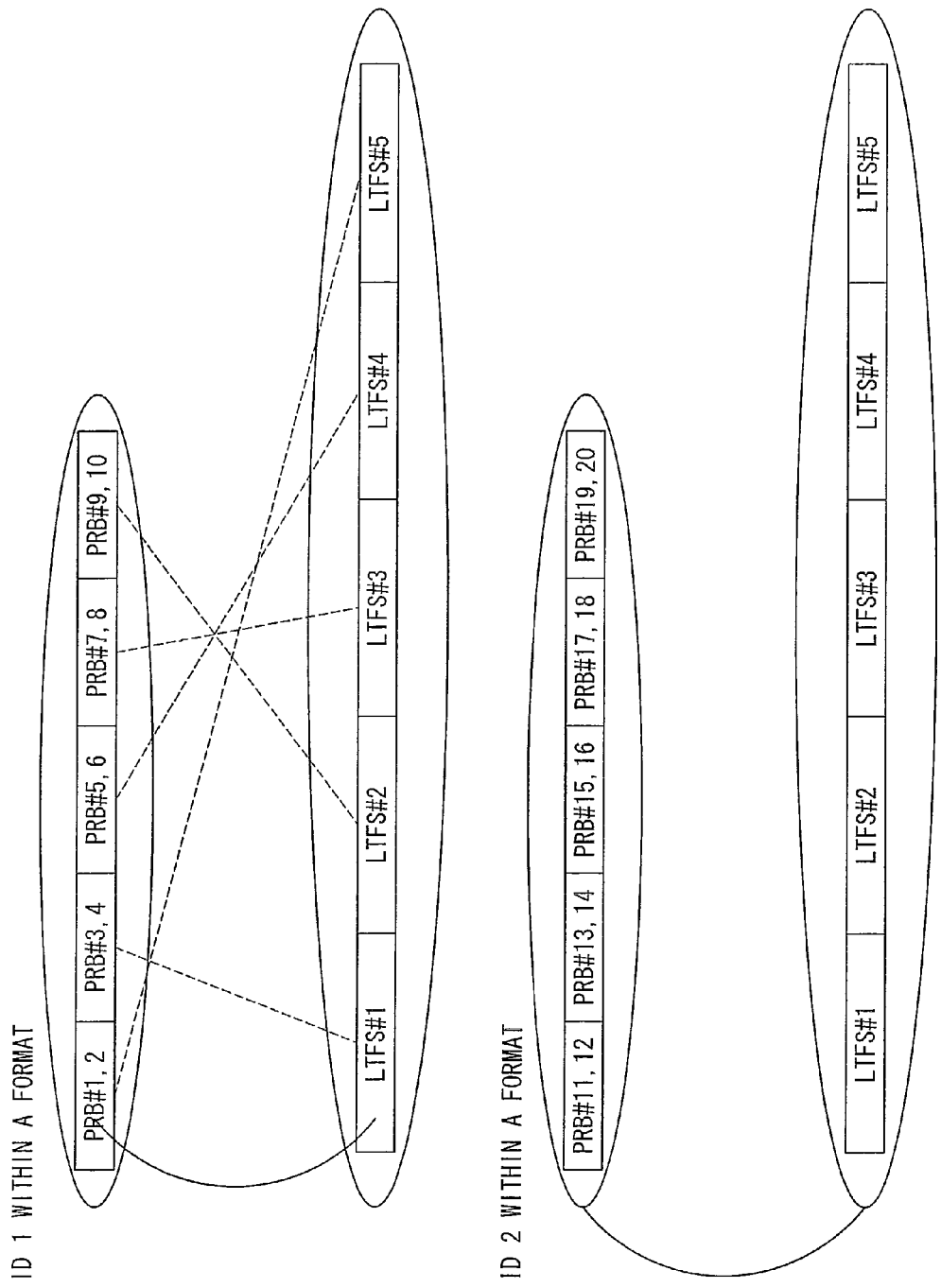
FIG. 12 is a view showing an example in which the group formation method for groups within a format shown in FIG. 10($a$) is applied to the signal format of the downlink shared control channel PSCCH shown in FIG. 8($c$).

FIG. 12 shows a case in which FIG. 8(c) and FIG. 10(a) are combined. In the case of Format 3, there are instances when limited resource allocation information is set. This limited resource allocation information is able to freely select a PRB within a PRB group or a PRU within a PRU group. The PRB which can be selected by LTFS is set as a PRB group, and the association between the PRB group and Format 3 is identified by the ID within the format. In this example, in the case of ID #1 within the format, PRB #1 through PRB #10 can be selected by means of LTFS. In the case of ID #2 within the format, PRB #11 through PRB #20 can be selected by means of LTFS.

Figure 10:
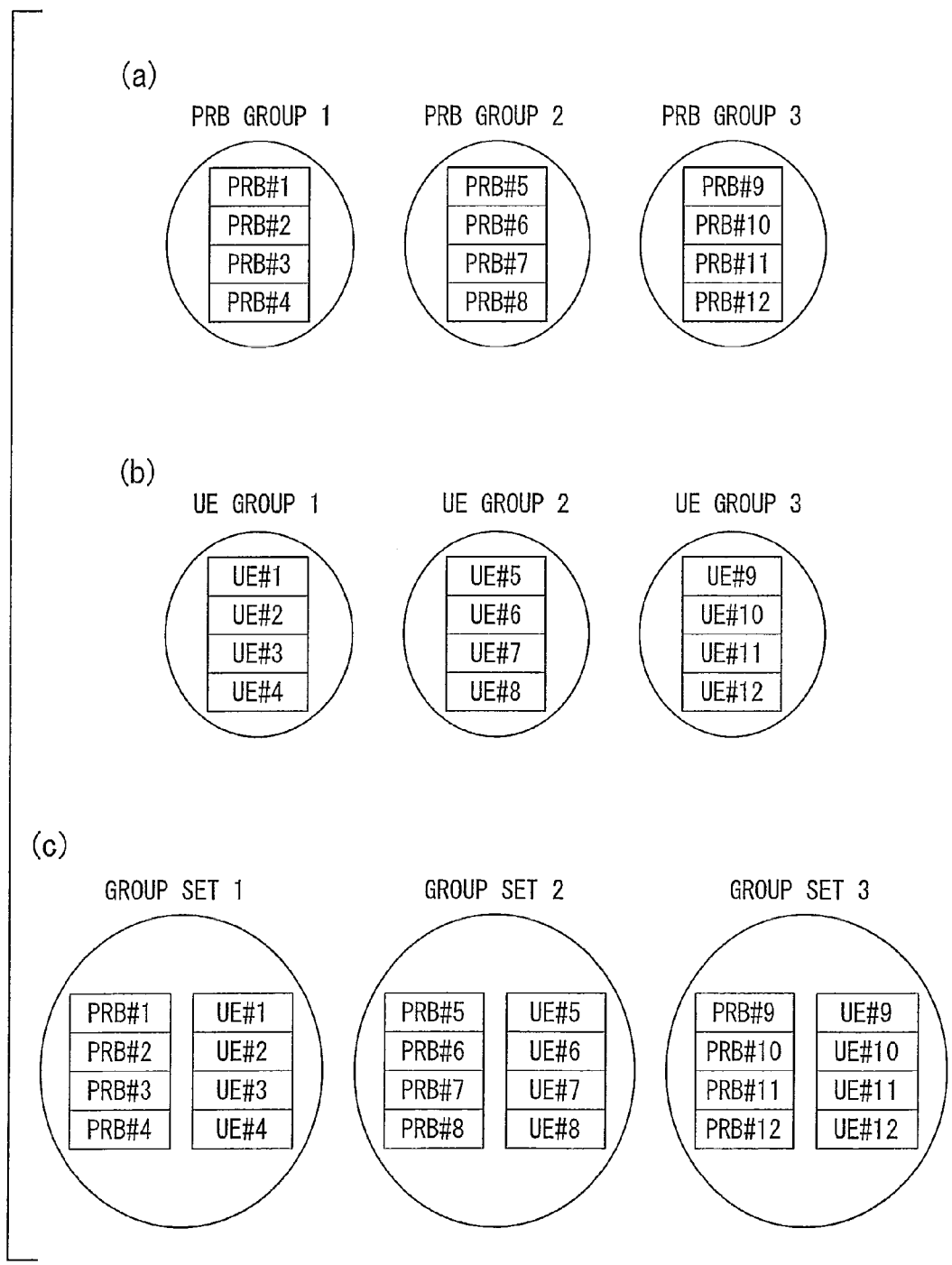
FIG. 10 is a view illustrating a group formation method for groups within a format.
Figure 13:
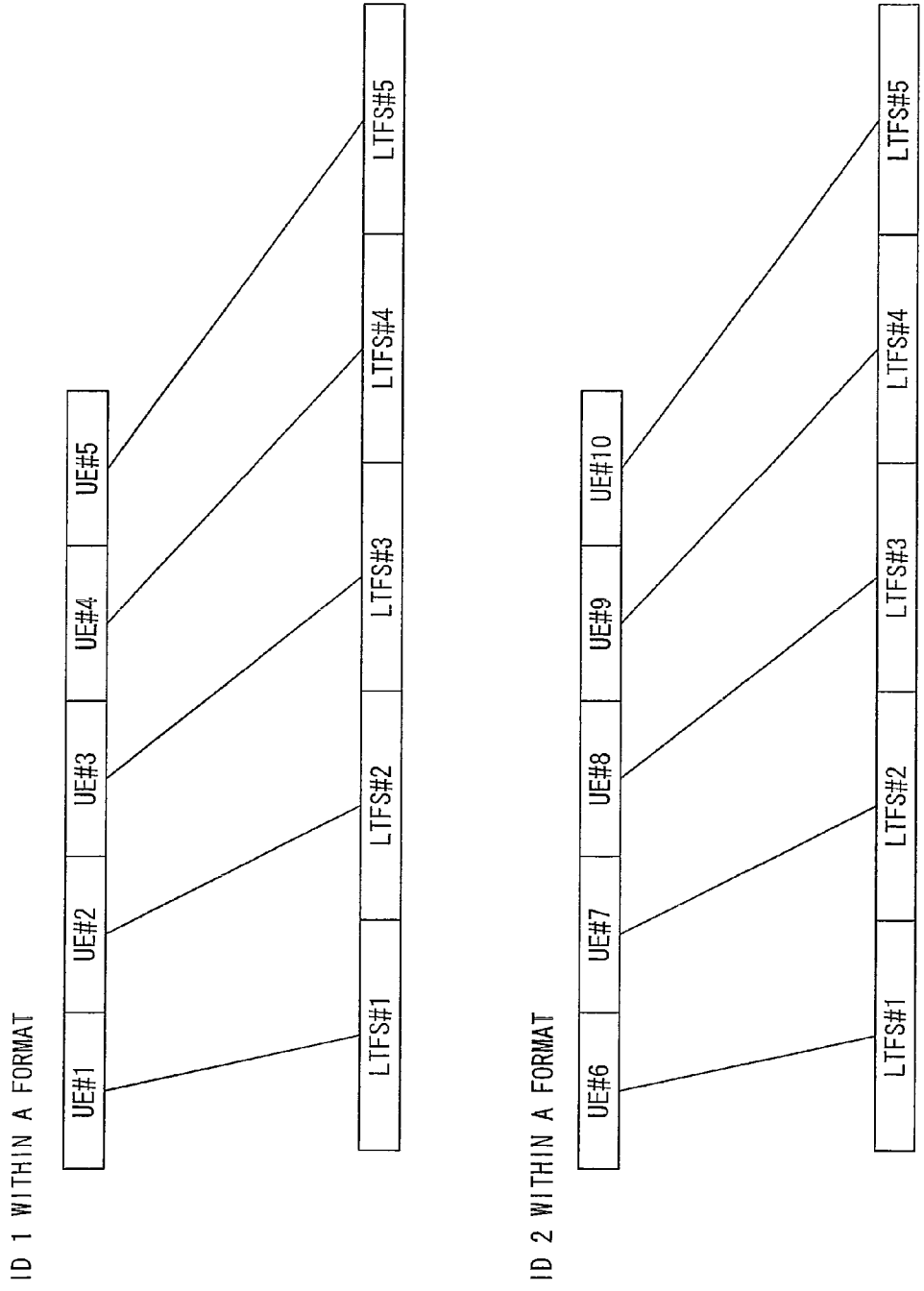
FIG. 13 is a view showing an example in which the group formation method for groups within a format shown in FIG. 10($b$) is applied to the signal format of the downlink shared control channel PSCCH shown in FIG. 8($c$).

FIG. 13 shows a case in which FIG. 8(*c*) and FIG. 10(*b*) are combined. In the case of Format 3, because there is no Short UEID information, it is necessary to associate in advance the placement of the LTFS with the mobile stations. This association is identified by the ID within the format. In this example, in the case of ID #1 within the format, the area of LTFS #1 is associated with UE #1. In the case of ID #2 within the format, the area of LTFS #1 is associated with UE #6.

Figure 14:
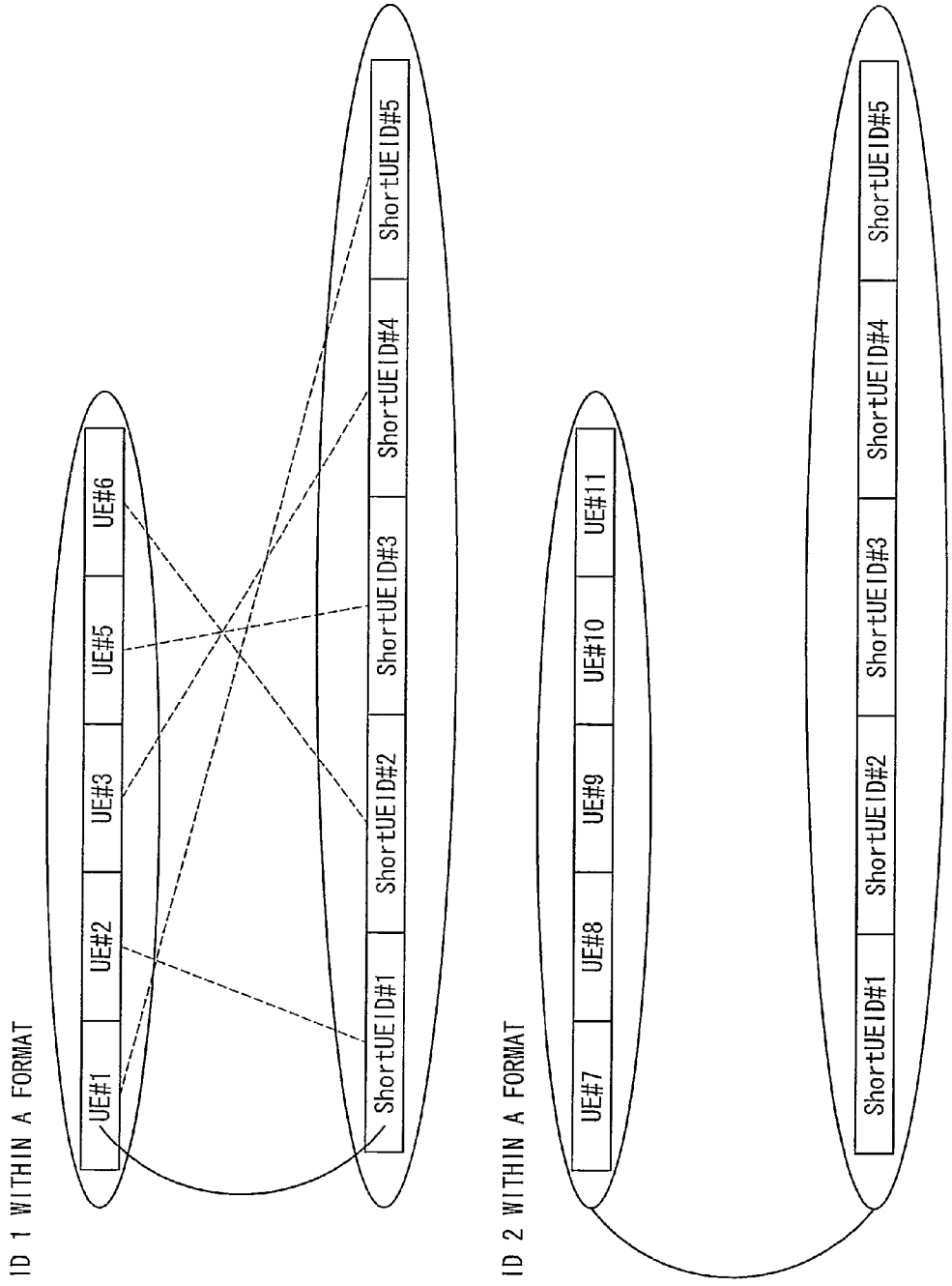
FIG. 14 is a view showing an example in which the group formation method for groups within a format shown in FIG. 10($a$) is applied to the signal format of the downlink shared control channel PSCCH shown in FIG. 8($a$).

FIG. 14 shows a case in which FIG. 8(*a*) and FIG. 10(*a*) are combined. In the case of Format 1, it is possible to identify mobile stations within a UE group by means of Short UEID. This Short UEID is able to freely select the mobile station within a UE group. The mobile group which can be selected by Short UEID is set as a UE group, and the association between the UE group and Format 1 is identified by the ID within the format. In this example, in the case of ID #1 within the format, UE #1 through UE #6 can be selected by means of Short UEID. In the case of ID #2 within the format, UE #7 through UE #11 can be selected by means of Short UEID.

When FIG. 9(*c*) and FIG. 10(*a*) are used simultaneously, the resources which can be used by the semi-static format mobile stations which are located in PSCCH #1 are limited to the PRB within PRB group 1. When FIG. 9(*c*) and FIG. 10(*b*) are used simultaneously, the semi-static format mobile stations which are located in PSCCH #1 are limited solely to the mobile stations within UE group 1. When FIG. 9(*c*) and FIG. 10(*a*) and FIG. 10(*b*) are used simultaneously, the semi-static format mobile stations which are located in PSCCH #1 are the mobile stations within UE group #1, and the usable resources are limited to PRB group 1.

3. Structures of the Base Station and Mobile Stations

Next, the structures of the base station device and mobile station devices which create the above described radio system of the present embodiment will now be described.

Figure 15:
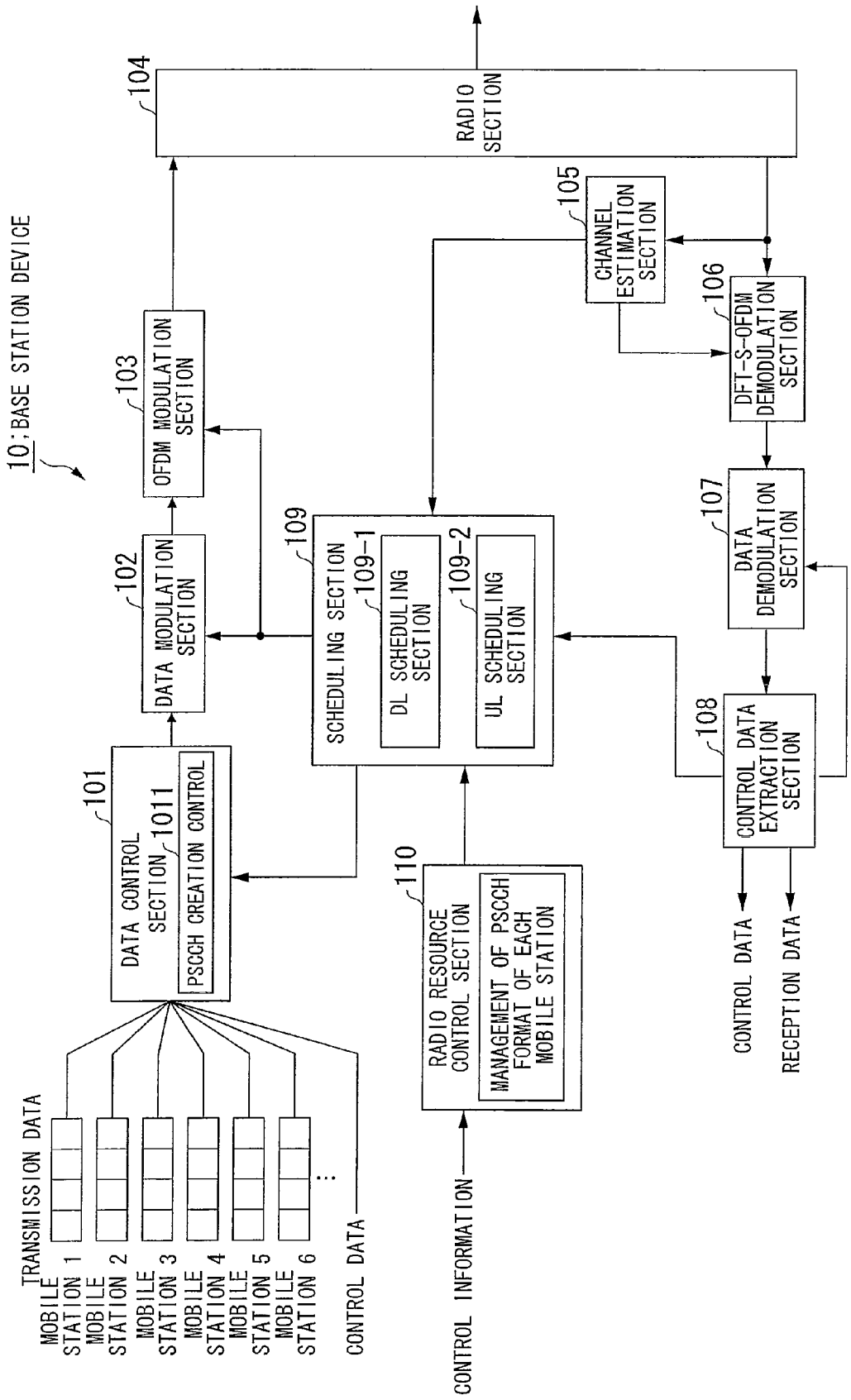
FIG. 15 is a block diagram showing the structure of a base station device.

FIG. 15 is a block diagram showing the structure of a base station device 10. The base station device 10 is constructed so as to include a data control section 101, a data modulation section 102, an OFDM modulation section 103, a radio section 104, a channel estimation section 105, a DFT-S-OFDM demodulation section 106, a data demodulation section 107, a control data extraction section 108, a scheduling section 109, and a radio resource control section 110.

Transmission data transmitted to the respective mobile station devices (i.e., the mobile station device 20 shown in FIG. 16 (described below)) and control data are input into the data control section 101. Based on commands from the scheduling section 109, the data control section 101 maps control data to the common control channel CCPCH, the synchronization channel SCH, the paging channel PCH, the downlink pilot channel DPICH, and the downlink shared control channel PSCCH, and maps transmission data to the downlink shared data channel PDSCH. Here, the data control section 101 has a PSCCH creation control section 1011, and this PSCCH creation control section 1011 performs the mapping in accordance with frequency scheduling information from the scheduling section 109.

The data modulation section 102 performs data modulation on the data of each channel input from the data control section 101 in accordance with the coding scheme and the data modulation scheme of the MCS information instructed by the scheduling section 109.

The OFDM modulation section 103 performs OFDM signal processing on input signals received from the data modulation section 102 such as serial/parallel conversion, IFFT (Inverse Fast Fourier Transform) processing, CP (Cyclic Prefix) processing, and filtering and the like so as to create an OFDM signal.

The radio section 104 upconverts data received from the OFDM modulation section 103 to a radio frequency, and transmits this by downlink to a mobile station device. The radio section 104 also receives data via uplink from mobile station devices, and down-converts the received data to a baseband signal which it then delivers to the channel estimation section 105 and the DFT-S-OFDM demodulation section 106.

The channel estimation section 105 estimates radio transmission path characteristics from uplink pilot signals which are provided by the data input from the radio section 104, and delivers the estimation results to the DFT-S-OFDM demodulation section 106 and the scheduling section 109.

The DFT-S-OFDM demodulation section 106 performs filtering, CP removal, DFT processing, and IFFT processing on received data received from the radio section 104, and performs DFT-S-OFDM demodulation based on radio transmission path estimation results from the channel estimation section 105.

The data demodulation section 107 demodulates received data in accordance with downlink MCS information extracted by the control data extraction section 108.

The control data extraction section 108 divides received data into user data and control data (i.e., uplink data-related control information and uplink non-data-related control information), and delivers these to a higher order layer. Note that information such as the transport block size and the like is included in the uplink data-related control information, while information such as downlink CQI feedback information and downlink HARQ ACK-NACK information is included in the uplink non-data-related control information. The control data extraction section 108 also delivers downlink MCS information from the control data to the data demodulation section 107, and delivers downlink CQI information to the scheduling section 109.

The scheduling section 109 is provided with a DL scheduling section 109-1 which performs downlink scheduling, and a UL scheduling section 109-2 which performs uplink scheduling.

Based on control information such as CQI information received by the mobile station devices, information about the PRB which can be used by the respective mobile station devices which was notified by the radio resource control section 110, the intermittent transmission and reception cycle, the PSCCH format (described below using FIG. 17), the buffer situation and the like, the DL scheduling section 109-1 performs scheduling processing in order to map transmission data (i.e., user data) on each channel on the downlink, and also calculates MCS information in order to modulate the respective data items.

Based on control information such as the result of the uplink radio transmission path estimation which was notified by the channel estimation section 105, information about the PRU which can be used by the respective mobile station devices which was notified by the radio resource control section 110, the intermittent transmission and reception cycle, the PSCCH format, the buffer situation and the like, the UL scheduling section 109-2 performs scheduling processing in order for the mobile station devices to map user data on each channel on the uplink, and also calculates MCS information in order to modulate the respective data items.

The radio resource control section 110 performs setting management for the PSCCH format using RRC signaling between itself and the radio resource control section (i.e., the radio resource control section 203 shown in FIG. 16 (described below)) of each of the mobile station devices. In addition, the radio resource control section 110 notifies the scheduling section 109 concerning control information such as information about PRB or PRU which can be used by the respective mobile station devices, the intermittent transmission and reception cycle, the PSCCH format, the buffer situation and the like.

Figure 16:
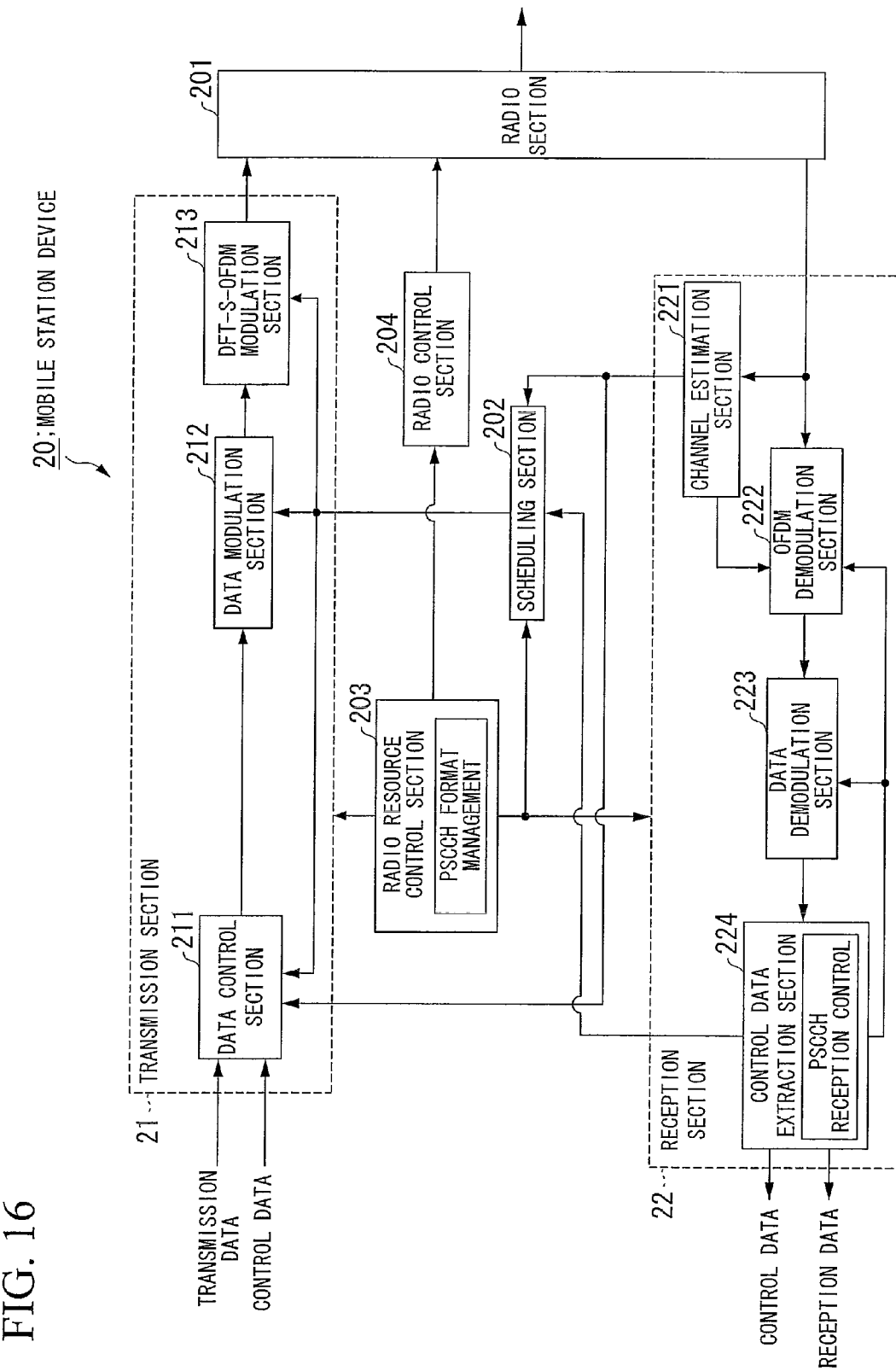
FIG. 16 is a block diagram showing the structure of a mobile station device.

FIG. 16 is a block diagram showing the structure of the mobile station device 20. The mobile station device 20 is formed so as to include a transmitting section 21, a receiving section 22, a radio section 201, a scheduling section 202, a radio resource control section 203, and a radio control section 204. The transmitting section 21 is formed so as to include a data control section 211, a data modulation section 212, and a DFT-S-OFDM modulation section 213. The receiving section 22 is formed so as to include a channel estimation section 221, an OFDM demodulation section 222, a data demodulation section 223, and a control data extraction section 224.

Transmission data (i.e., user data) and control data (i.e., uplink data-related control information and uplink non-data-related control information) are input into the data control section 211. The data control section 211 maps the input transmission data and control data to the uplink PRU in accordance with instructions from the scheduling section 202.

The data modulation section 212 performs data modulation on the respective data items input from the data control section 211 in accordance with the coding scheme and the data modulation scheme in the MCS information instructed by the scheduling section 202.

The DFT-S-OFDM modulation section 213 performs DFT-spread OFDM signal processing such as serial/parallel conversion, spreading code and scrambling code multiplication processing, DFT conversion, subcarrier mapping processing, IFFT processing, CP insertion, filtering and the like on data input from the data modulation section 212, and creates DFT-spread OFDM signals. Note that schemes other than the DFT-spread OFDM scheme can be used for the above described uplink communication scheme and, for example, single carrier schemes such as VSCRF-CDMA, and multi-carrier schemes such as OFDM schemes may be used.

The radio section 201 upconverts data from the DFT-S-OFDM modulation section 213 to the radio frequency instructed by the radio control section 204, and transmits it using an uplink to a base station device (i.e., to the base station device 10 shown in FIG. 15). The radio section 201 also receives downlink data from the base station device, and downconverts the received data to a baseband signal which it then delivers to the channel estimation section 221 and the OFDM demodulation section 222.

The channel estimation section 221 estimates radio transmission path characteristics using the downlink pilot channel DPICH from the radio section 201, and delivers the estimation result to the OFDM demodulation section 222. The channel estimation section 221 also converts the radio transmission path estimation result to CQI information, and delivers this CQI information to the data control section 211 and the scheduling section 202. Note that the CQI information is used in order to the notify the base station device about the radio transmission path estimation result.

The OFDM demodulation section 222 performs OFDM signal processing such as CP removal, filtering, and FFT processing and the like on data received from the radio section 201, and performs OFDM demodulation based on the radio transmission path estimation result from the channel estimation section 221.

The data demodulation section 223 demodulates received data in accordance with the downlink MCS information extracted by the control data extraction section 224.

The control data extraction section 224 separates the received data into user data (for the downlink shared data channel PDSCH) and control data (for the downlink shared control channel PSCCH). The control data extraction section 224 also delivers the downlink MCS information from the separated control data to the data demodulation section 223, and delivers uplink MCS information and scheduling information to the scheduling section 202.

The scheduling section 202 issues commands to the data control section 211, the data modulation section 212, and the DFT-S-OFDM modulation section 213 in accordance with the uplink MCS information and scheduling information received from the base station device in order for the transmission data and control data to be mapped to a physical channel.

The radio resource control section 203 manages information about usable PRB or PRU, the intermittent transmission and reception cycle, and the PSCCH format and the like, and delivers these respective management information items to the transmitting section 21, the receiving section 22, the scheduling section 202, and the radio control section 204 so as to perform the overall control of the mobile station device 20.

4. Operations of the Base Station and Mobile Stations

Next, a description will be given using FIGS. 17 through 19 of the operations of the above described base station and mobile stations.

Figure 17:
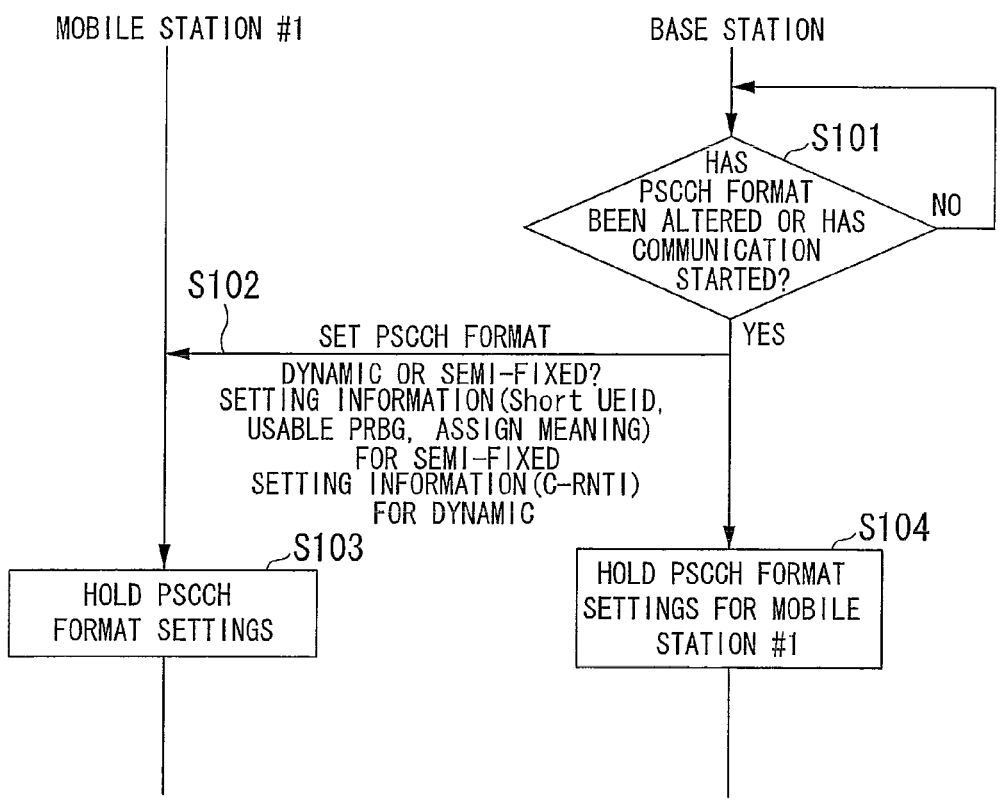
FIG. 17 is a sequence diagram showing a procedure by which a base station sets a PSCCH format for a mobile station.

FIG. 17 is a sequence diagram showing a procedure performed by a base station to set a PSCCH format in a mobile station. The PSCCH format is formed by information indicating whether the mobile station will use a dynamic format or a semi-static format, and setting information for both the dynamic format and semi-static format. Included in the setting information for the semi-static format are information showing the format allocated to the mobile station, information showing the grouping within the format allocated to the mobile station, identification information for the format or group within a format, information showing a relationship between the format and the physical placement of the downlink shared control channel PSCCH, information showing a relationship between the group within the format and the physical placement of the downlink shared control channel PSCCH, information showing a relationship between the group within the format and the usable PRB or PRU, the Short UEID which can be used by the group within the format, information indicating which control information is to be used for the LTFS, and the like. The mobile station identification information C-RNTI is included in the setting information for the dynamic format.

In FIG. 17, the base station uses RRC signaling to transmit a PSCCH format setting signal to the mobile station when communication with the mobile station begins (i.e., for radio bearer setup, during signal transmission, or during signal reception) or when there is an alteration to the control signal format during communication with the mobile station (step S101 and step S102). The mobile station receives the PSCCH format setting signal transmitted from the base station, holds that PSCCH format, and performs the next and subsequent communications (i.e., transmissions and receptions of the downlink shared data channel PDSCH and the uplink shared data channel PUSCH, and the reception of control information using the downlink shared control channel PDSCH) in accordance with the relevant PSCCH format (step S103). The base station also holds the PSCCH format transmitted to the respective mobile stations, and performs the next and subsequent communications with the respective mobile stations in accordance with the relevant PSCCH format (step S104).

Figure 18:
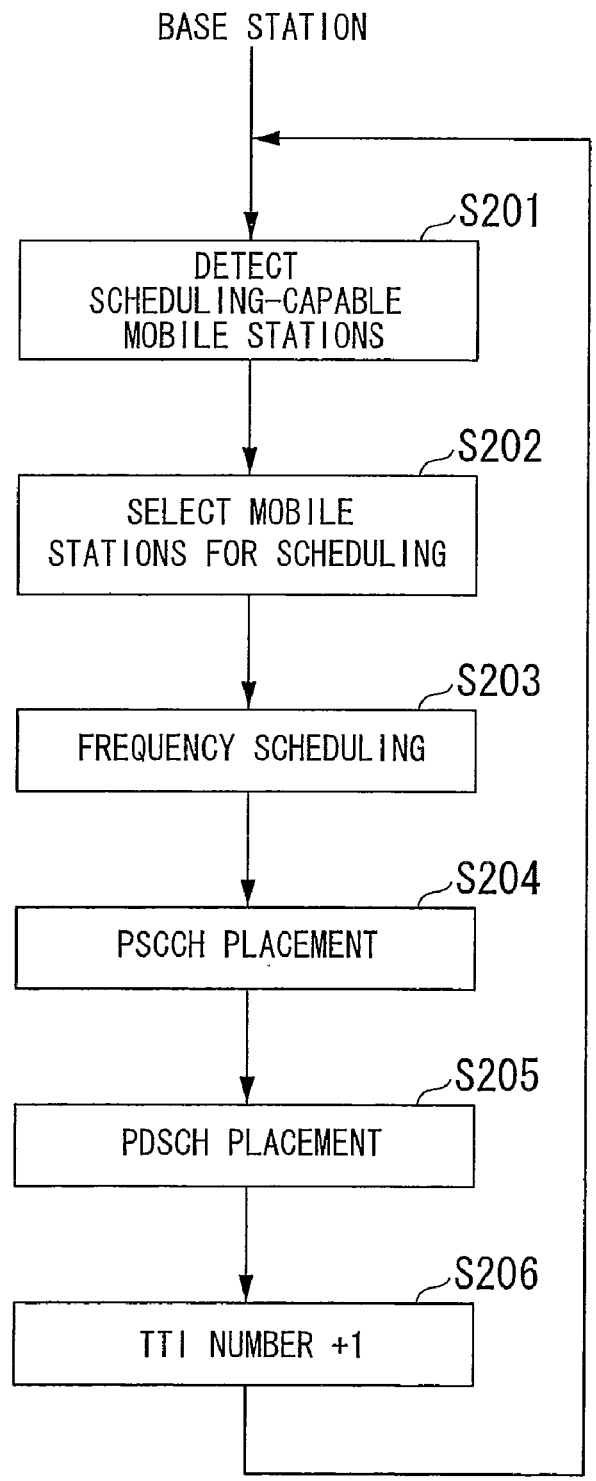
FIG. 18 is a flowchart showing processing performed by a base station in 1 TTI.

FIG. 18 is a flowchart showing the processing performed by a base station in 1 TTI.

In each TTI, the base station detects mobile stations for which scheduling is possible based on the PSCCH format setting (step S201), and selects high priority mobile stations from among the detected scheduling-capable mobile stations (step S202). This priority determination is made on the basis of transmission path situation of each mobile station, the buffer situation, the service class, and the QoS (Quality of Service) and the like. Next, the base station determines the PRB or PRU allocated to the selected mobile stations and performs frequency scheduling (step S203). The base station then transmits control information (C-RNTI, Cat2, Cat3) by means of the downlink shared control channel PSCCH to dynamic format mobile stations from among the selected mobile stations, and transmits a format ID (or group ID) and LTFS to semi-static format mobile stations from among the selected mobile stations (step S204). Next, the base station places the downlink shared data channel PDSCH addressed to the relevant mobile station in the PRB specified by the downlink shared control channel PSCCH transmitted to the mobile station, and then transmits user data (step S205). Thereafter, it moves to the next TTI (step S206).

Note that when the base station is placing the downlink shared data channel PDSCH, it makes this placement based on information showing the format allocated to the mobile station, information showing the grouping within the format allocated to the mobile station, identification information for the format or group within a format, information showing a relationship between the format and the physical placement of the downlink shared control channel PSCCH, the relationship between the group within the format and the physical placement of the downlink shared control channel PSCCH, the relationship between the group within the format and the usable PRB group, and the Short UEID grouping which can be used by the group within the format.

Figure 19:
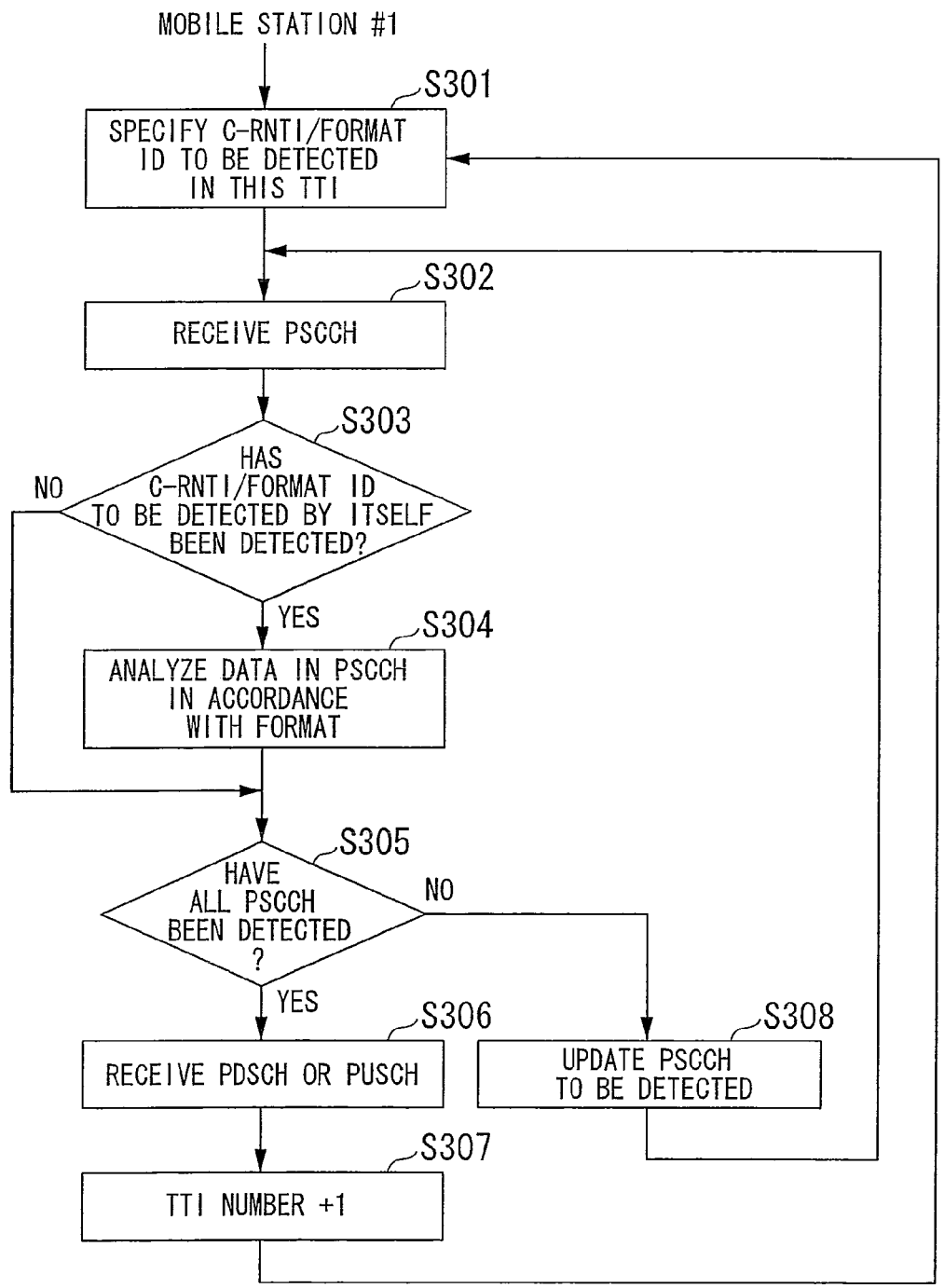
FIG. 19 is a flowchart showing processing performed by a mobile station in 1 TTI.

FIG. 19 is a flowchart showing the processing performed by a mobile station in 1 TTI.

In each TTI, in accordance with the PSCCH format settings (once the reception of step S103 of FIG. 17 has ended), the mobile station specifies the C-RNTI or format ID (or group ID) to be detected based on whether or not a PRB or PRU which it is able to use is included therein, and on the physical placement of the downlink shared control channel PSCCH which it should be detecting, and on the information string which should be included in the CRC area of the downlink shared control channel PSCCH, and the like (step S301). If a usable PRB or PRU is not included therein, processing is ended in that TTI.

If a usable PRB or PRU is included therein, the mobile station receives the downlink shared control channel PSCCH (step S302), and when its own C-RNTI or format ID (or group ID) has been detected in the CRC check (step S303), it performs analysis on the data within the downlink shared control channel PSCCH in accordance with the PSCCH format (step S304). Here, in the case of a semi-static format, the mobile station interprets the detected format ID (or group ID) and the format which is determined by the PSCCH format, and obtains the Short UEID and LTFS. After the mobile station has analyzed the data within the downlink shared control channel PSCCH, it performs transmission and reception of the downlink shared data channel PDSCH and the uplink shared data channel PUSCH in accordance with the specified modulation scheme and coding scheme and the like (step S306). In the format in which the Short UEID is included, if the mobile station is unable to detect its own Short UEID, the processing of this downlink shared control channel PSCCH is ended.

In contrast, if the mobile station is unable to detect its own C-RNTI in the CRC check in step S303, the mobile station determines whether or not it has checked all the downlink shared control channels PSCCH which it should have checked in accordance with the PSCCH format (step S305), and if it has checked all the downlink shared control channels PSCCH, then the processing in this TTI is ended. If it has not checked all the downlink shared control channels PSCCH, it updates the downlink shared control channels PSCCH which need to be detected (step S308), and once again performs the downlink shared control channel PSCCH detection processing.

An embodiment of this invention has been described in detail above with reference made to the drawings, however, the specific structure thereof is not limited to this and various design modifications and the like are possible insofar as they do not depart from the spirit or scope of this invention.

The program which is operated by the base station device and mobile station devices according to the present invention is a program which controls a CPU or the like (i.e., a program which causes a computer to function) so as to achieve the functions of the above described embodiment of the present invention. In addition, information handled by these devices is temporarily stored in RAM during the above described processing, and is thereafter stored in ROM or on a HDD or the like where it can be read, modified, or rewritten when required by the CPU.

The recording medium which stores this program maybe any one of a semiconductor medium (for example, ROM or a nonvolatile memory card or the like), an optical recording medium (for example, a DVD, MO, MD, CD, BD, or the like), or a magnetic recording medium (for example, magnetic tape or a flexible disk or the like), or the like.

Moreover, not only is it possible for the functions of the above described embodiment to be implemented by executing the loaded program, but the functions of the present invention may also be implemented by performing this processing in conjunction with an operating system or another application program or the like based on commands from this program.

When this product is distributed to the marketplace, the program can be stored on a portable recording medium and distributed, or it can be transferred to a server computer which is connected via a network such as the Internet or the like. In this case, the recording device of the server computer also functions as the recording medium of the present invention.

INDUSTRIAL APPLICABILITY

It is possible to transmit and receive control information efficiently in a radio system.

The invention claimed is:

1. A base station device which transmits a plurality of items of control information to mobile station devices, by means of a control information transmission channel, comprising a CRC bit string which is obtained by performing CRC on the control information transmission channel is transmitted to the mobile station devices by means of the control information transmission channel as identification information for formats which relate to the arrangement of the plurality of items of control information within the control information transmission channel.

2. The base station device according to claim 1, comprising the control information is downlink control information which includes any one of positions of PRB where data addressed to the mobile station devices is placed, modulation scheme, data length, and information required for HARQ.

3. The base station device according to claim 1, comprising the control information is uplink control information which includes any one of positions of PRB to which the mobile station devices transmit data, modulation scheme, data length, transmission timing control, power control, and a HARQ ACK/NACK for the data transmitted by the mobile station devices.

4. A mobile station device which receives a plurality of items of control information from a base station device, by means of a control information transmission channel, comprising
the mobile station device receives a CRC bit string which is obtained by performing CRC on the control information transmission channel from the base station device, by means of the control information transmission channel as identification information for formats which relate to the arrangement of the plurality of items of control information within the control information transmission channel, and acquires the control information in accordance with the identification information.

5. The mobile station device according to claim 4, comprising
the control information is downlink control information which includes any one of positions of PRB where data addressed to the mobile station devices is placed, modulation scheme, data length, and information required for HARQ.

6. The mobile station device according to claim 4, comprising
the control information is uplink control information which includes any one of positions of PRB to which the mobile station devices transmit data, modulation scheme, data length, transmission timing control, power control, and a HARQ ACK/NACK for the data transmitted by the mobile station devices.

7. A control information transmission method for transmitting a plurality of items of control information from a base station device to mobile station devices, by means of a control information transmission channel, comprising
transmitting a CRC bit string which is obtained by performing CRC on the control information transmission channel from the base station device to the mobile station devices by means of the control information transmission channel as identification information for formats which relate to the arrangement of the plurality of items of control information within the control information transmission channel.

8. A control information reception method in which mobile station devices receive a plurality of items of control information from a base station device, by means of a control information transmission channel, comprising
receiving a CRC bit string which is obtained by performing CRC on the control information transmission channel from the base station device, by means of the control information transmission channel as identification information for formats which relate to the arrangement of the plurality of items of control information within the control information transmission channel; and acquiring the control information in accordance with the identification information.

* * * * *